US012686309B2

(12) United States Patent
Lee et al.

(10) Patent No.: US 12,686,309 B2
(45) Date of Patent: Jul. 21, 2026

(54) ARMREST FOR A VEHICLE SEAT AND METHODS OF USE THEREOF

(71) Applicant: GM GLOBAL TECHNOLOGY OPERATIONS LLC, Detroit, MI (US)

(72) Inventors: Wooram Lee, Namdong-gu (KR); Sangik Cha, Seocho-gu (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 330 days.

(21) Appl. No.: 18/404,208

(22) Filed: Jan. 4, 2024

(65) Prior Publication Data

US 2025/0222845 A1     Jul. 10, 2025

(51) Int. Cl.
B60N 2/75          (2018.01)
B60N 3/00          (2006.01)
(52) U.S. Cl.
CPC .............. B60N 2/79 (2018.02); B60N 2/753 (2018.02); B60N 3/002 (2013.01)
(58) Field of Classification Search
CPC .......... B60N 2/79; B60N 2/753; B60N 3/002; B60N 2/763; B64D 11/0638; A47C 7/70
See application file for complete search history.

(56) References Cited

U.S. PATENT DOCUMENTS

| | | | | |
|---|---|---|---|---|
| 2,494,838 A | * | 1/1950 | Slaughter ................. | A47C 7/70 297/145 |
| 2,841,212 A | * | 7/1958 | De Vos .................. | B60N 3/002 297/146 |

FOREIGN PATENT DOCUMENTS

| | | | | | |
|---|---|---|---|---|---|
| CN | 108909567 A | * | 11/2018 | ............. | B60N 3/002 |
| DE | 10034477 A1 | | 1/2002 | | |
| GB | 2426494 A | * | 11/2006 | ............. | B60N 3/002 |
| JP | 2017222221 A | | 12/2017 | | |
| KR | 101937238 B1 | * | 1/2019 | ............. | B60N 2/793 |
| KR | 20220102688 A | * | 7/2022 | ............... | B60N 2/79 |

OTHER PUBLICATIONS

English translation of CN-108909567-A (Year: 2018).*
English translation of KR-101937238-B1 (Year: 2019).*
English translation of KR-20220102688-A (Year: 2022).*

* cited by examiner

*Primary Examiner* — David R Dunn
*Assistant Examiner* — Troy Alan Libby
(74) *Attorney, Agent, or Firm* — Ingrassia Fisher & Lorenz, LLP | IF&L

(57)          ABSTRACT

Armrests for vehicle seats and methods of using the armrests are provided. The armrests include a first portion coupled to the vehicle seat, and a second portion having a first member secured to the first portion, a second member pivotally coupled to the first member, and a third member pivotally coupled to the second member. The second portion is configured to selectively transition between a folded configuration and an unfolded configuration. The first member, the second member, and the third member are stacked and in combination configured to support an arm of an occupant of the vehicle seat while the armrest is in the in the folded configuration. The second member and the third member are cantilevered from the first member, extend across at least a portion of the vehicle seat, and are configurated to support a load thereon while the armrest is in the unfolded configuration.

20 Claims, 5 Drawing Sheets

100

110

112

114

116

118

120

ARMREST FOR A VEHICLE SEAT AND METHODS OF USE THEREOF

INTRODUCTION

The technical field generally relates to vehicle seats, and more particularly relates to an armrest for a vehicle seat that is capable of unfolding to dispose a portion thereof over the vehicle seat and support a load thereon.

Contemporary automobiles offer a range of amenities designed to enhance the comfort of their occupants. Examples of these features include adjustable seats that can be customized to accommodate specific occupants, including adjustments for seat height, recline angle, lumbar support, and headrest height.

Accordingly, it is desirable to provide systems and methods capable of promoting occupant comfort while in a vehicle. Furthermore, other desirable features and characteristics of the present disclosure will become apparent from the subsequent detailed description and the appended claims, taken in conjunction with the accompanying drawings and the foregoing introduction.

SUMMARY

A method is provided for using an armrest of a vehicle seat. In one example, the method includes transitioning the armrest from a folded configuration to an unfolded configuration. The armrest includes a first member secured in a fixed position, a second member pivotally coupled to the first member, and a third member pivotally coupled to the second member. In the folded configuration the first member, the second member, and the third member are stacked. Transitioning the armrest from the folded configuration to the unfolded configuration includes pivoting the second member relative to the first member to dispose the armrest in an intermediate configuration, pivoting the third member relative to the second member to dispose the armrest in the unfolded configuration, and applying a load onto the second member and/or the third member. The second member and the third member are cantilevered from the first member and extend across a first portion of the vehicle seat while the armrest is in the intermediate configuration. The third member is cantilevered from the second member and extends across a second portion of the vehicle seat while the armrest is in the unfolded configuration.

In various examples, the method may include transitioning the armrest from the unfolded configuration to the folded configuration by pivoting the third member relative to the second member such that the third member is stacked with the second member and extends across the first portion of the vehicle seat, pivoting the second member relative to the first member such that the second member and the third member are stacked with the first member, and supporting an arm of an occupant of the vehicle seat on the armrest.

In various examples, a first portion of the armrest may be coupled to the vehicle seat, a second portion of the armrest may include the first member, the second member, and the third member, and the first member may be secured to the first portion. In such examples, pivoting the second member relative to the first member such that the second member and the third member are stacked with the first member may dispose adjacent exterior surfaces of the first portion and the second portion in aligned positions.

In various examples, pivoting the second member relative to the first member such that the second member and the third member are stacked with the first member may dispose first adjacent exterior surfaces of the first member and the second member in first aligned positions, and second adjacent exterior surfaces of the second member and the third member in second aligned positions.

In various examples, pivoting the second member relative to the first member may include pivoting the second member by 180 degrees.

In various examples, pivoting the third member relative to the second member may include pivoting the third member by 180 degrees.

In various examples, the second member is disposed between the first member and the third member in the folded configuration such that a first face of the first member is directed toward a second face of the second member, and a third face of the second member oppositely disposed the second face of the second member is directed toward a fourth face of the third member. In such examples, transitioning the armrest from the folded configuration to the unfolded configuration may include disposing the first face of the first member, the second face of the second member, and a fifth face of the third member oppositely disposed the fourth face of the third member are aligned in a geometric plane.

In various examples, the first face of the first member and the second face of the second member may be aligned in the geometric plane and the third member may not be disposed in the geometric plane while the armrest is in the intermediate configuration.

An armrest is provided for a vehicle seat. In one example, the armrest includes a first portion configured to be coupled to the vehicle seat, and a second portion having a first member secured to the first portion, a second member pivotally coupled to the first member, and a third member pivotally coupled to the second member. The second portion is configured to selectively transition between a folded configuration and an unfolded configuration. The first member, the second member, and the third member are stacked and in combination configured to support an arm of an occupant of the vehicle seat while the armrest is in the in the folded configuration. The second member and the third member are cantilevered from the first member, extend across at least a portion of the vehicle seat, and are configured to support a load thereon while the armrest is in the unfolded configuration.

In various examples, the second member may be disposed between the first member and the third member such that a first face of the first member is directed toward a second face of the second member and a third face of the second member oppositely disposed the second face of the second member is directed toward a fourth face of the third member while the armrest is in the folded configuration.

In various examples, the first face of the first member, the second face of the second member, and a fifth face of the third member oppositely disposed the fourth face of the third member may be aligned in a geometric plane while the armrest is in the unfolded configuration.

In various examples, the second portion may be configured to transition from the folded configuration to the unfolded configuration by pivoting the second member relative to the first member over the vehicle seat to dispose the armrest in an intermediate configuration, and then pivoting the third member relative to the second member over the vehicle seat. The first face of the first member and the second face of the second member may be aligned in a geometric plane and the third member may not be disposed in the geometric plane while the armrest is in the intermediate configuration.

In various examples, adjacent exterior surfaces of the first portion and the second portion may be aligned while the armrest is in the folded configuration.

In various examples, first adjacent exterior surfaces of the first member and the second member may be aligned and second adjacent exterior surfaces of the second member and the third member may be aligned while the armrest is in the folded configuration.

In various examples, the second portion may be configured to transition from the folded configuration to the unfolded configuration by pivoting the second member relative to the first member over the vehicle seat to dispose the armrest in an intermediate configuration, and then pivoting the third member relative to the second member over the vehicle seat.

In various examples, the second member may be configured to pivot relative to the first member by 180 degrees.

In various examples, the third member may be configured to pivot relative to the second member by 180 degrees.

A vehicle is provided that, in one example, includes a vehicle seat and an armrest including a first portion coupled to the vehicle seat and a second portion having a first member secured to the first portion, a second member pivotally coupled to the first member, and a third member pivotally coupled to the second member. The second portion is configured to selectively transition between a folded configuration and an unfolded configuration. The first member, the second member, and the third member are stacked and in combination configured to support an arm of an occupant of the vehicle seat while the armrest is in the folded configuration. The second member and the third member are cantilevered from the first member, extend across at least a portion of the vehicle seat, and configurated to support a load thereon while the armrest is in the unfolded configuration.

In various examples, the second member may be disposed between the first member and the third member such that a first face of the first member is directed toward a second face of the second member and a third face of the second member oppositely disposed the second face of the second member is directed toward a fourth face of the third member while the armrest is in the folded configuration. In such examples, the first face of the first member, the second face of the second member, and a fifth face of the third member oppositely disposed the fourth face of the third member may be aligned in a geometric plane while the armrest is in the unfolded configuration.

In various examples, the second portion may be configured to transition from the folded configuration to the unfolded configuration by pivoting the second member relative to the first member over the vehicle seat to dispose the armrest in an intermediate configuration, and then pivoting the third member relative to the second member over the vehicle seat. In such examples, the first face of the first member and the second face of the second member may be aligned in the geometric plane and the third member may not be disposed in the geometric plane while the armrest is in the intermediate configuration.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
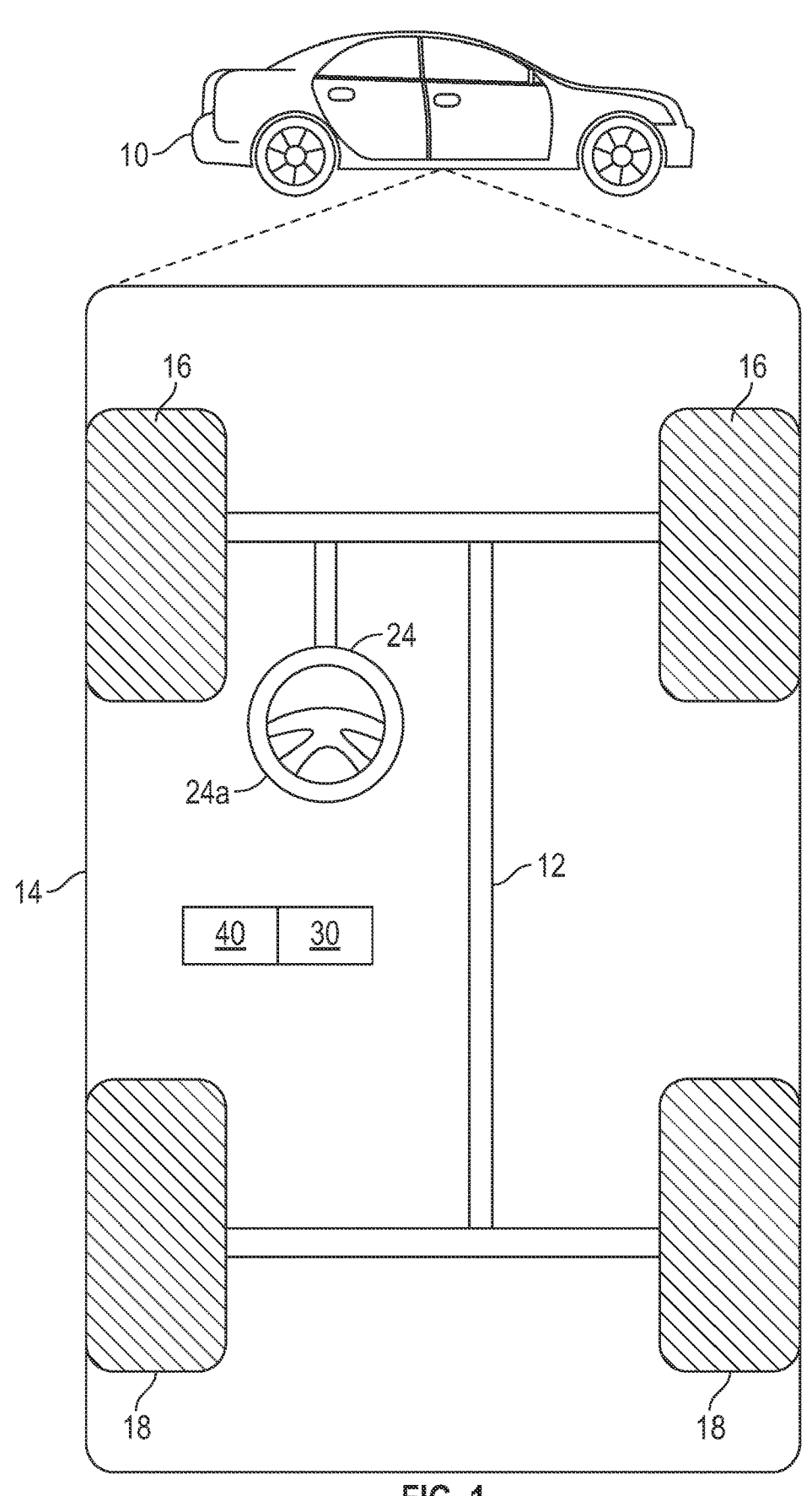
FIG. 1 is a functional block diagram of a vehicle having a seat with an armrest in accordance with an example.

FIG. 1 illustrates a vehicle 10, according to an example. In certain examples, the vehicle 10 comprises an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 may include a steering system 24. The steering system 24 influences a position of the wheels 16-18. While depicted as including a steering wheel 24a for illustrative purposes, in some examples contemplated within the scope of the present disclosure, the steering system 24 may not include a steering wheel.

The vehicle 10 may include a seat 30 configured to support an occupant of the vehicle 10 sitting thereon. The seat 30 may include a frame (not shown) secured to a floor of the vehicle 10, a seat cushion 32 coupled to the frame, a seatback 34 secured at a lower end thereof to the seat cushion 32 and/or the frame, and a headrest (not shown) secured to an upper end of the seatback 34. The seat cushion 32 may be configured to support a rear and/or thighs of the occupant seated thereon, the seatback 34 may be configured to support the occupant's back while seated on the seat cushion 32, and the headrest may be configured to support the occupant's head. The seat 30 may include various components that provide for adjustment of the seat 30, such as systems for adjusting a height of the seat 30 relative to the vehicle floor, a recline angle of the seatback 34, lumbar support, and a height of the headrest relative to an upper end of the seatback 34. Although the vehicle 10 is depicted as including a single seat 30, the vehicle 10 may include more than one seat 30, such as two, four, six, or more seats 30.

The seat 30 includes an armrest 40 configured to support an arm of the occupant while seated on the seat cushion 32.

Figure 2:
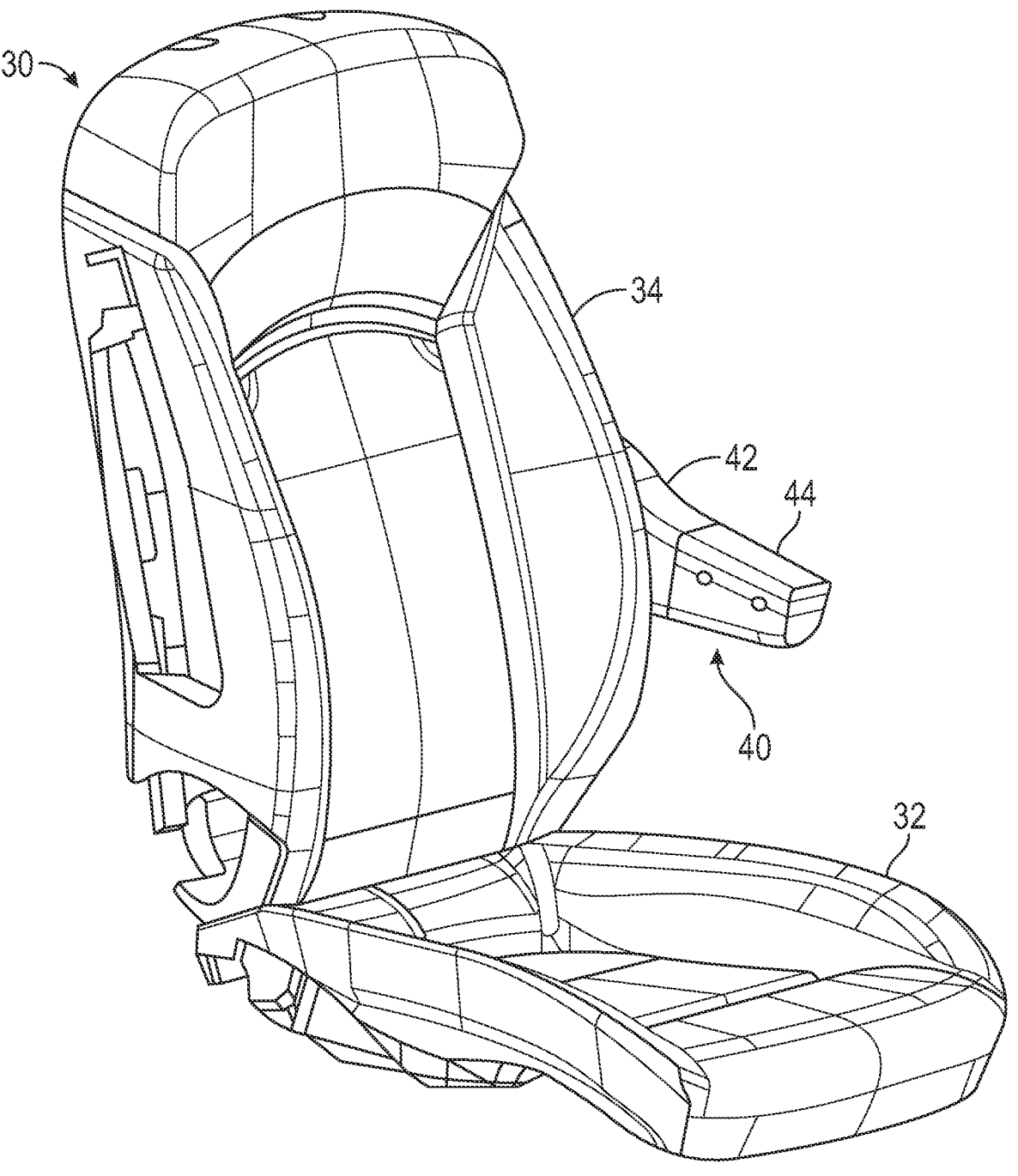
FIG. 2 is a perspective view of the seat with the armrest of FIG. 1 in accordance with an example.

The armrest 40 includes a first portion 42 configured to secure to the frame and/or the seatback 34 on either side of the seatback 34. In some examples, the seat 30 may include two armrests 40 each secured to a corresponding side of the seat 30. The armrest 40 may be secured at various positions along the side of the seatback 34 to provide for various dimensions (e.g., heights) between the seat cushion 32 and the armrest 40. In some examples, the height of the armrest 40 may be adjustable, for example, by sliding and locking the armrest 40 at various positions along the side of the seatback 34. In some examples, the first portion 42 may be rotatably coupled to the seat 30. For example, the first portion 42 may be rotated between first and second positions, wherein in the first position a distal end thereof is adjacent to or alongside of the seatback 34 and in the second position the distal end extends away from the seatback 34 (e.g., as shown in FIG. 2). In such examples, the occupant may rotate the first portion 42 into the first position when use of the armrest 40 is not desired, and rotate the first portion 42 into the second position when use of the armrest 40 is desired.

The armrest 40 includes a second portion 44 having a first member 46 secured to the first portion 42, a second member 48 pivotally coupled to the first member 46, and a third member 50 pivotally coupled to the second member 48. The first member 46 and the second member 48 may be coupled with first pivoting joints 52. The second member 48 and the third member 50 may be coupled with second pivoting joints 54. The second portion 44 is configured to be selectively transitioned between a folded configuration (e.g., as shown in FIGS. 2-4) and an unfolded configuration (as shown in FIG. 6).

In the folded configuration, the first member 46, the second member 48, and the third member 50 are stacked and in combination configured to support an arm of the occupant of the seat 30. In the example of FIGS. 2-4, while stacked, the second member 48 is disposed between the first member 46 and the third member 50. In some examples, while the second portion 44 is in the folded configuration, the first pivoting joints 52 are disposed on sides of the first member 46 and the second member 48 closest to the seat 30, referred to as the seat side of the armrest 40. In some examples, while the second portion 44 is in the folded configuration, the second pivoting joints 54 are disposed on sides of the first member 46 and the second member 48 furthest from the seat 30, referred to as the outer side of the armrest 40.

In some examples, while the second portion 44 is in the folded configuration, first adjacent exterior surfaces of the first portion 42 and the second portion 44, that is, exterior surfaces adjacent to a distal end of the first portion 42 and a proximal end of the second portion 44, are aligned or flush. In some examples, while the second portion 44 is in the folded configuration, second adjacent exterior surfaces of the first member 46 and the second member 48, that is, along sides or edges of the first member 46 and the second member 48, are aligned or flush. In some examples, while the second portion 44 is in the folded configuration, third adjacent exterior surfaces of the second member 48 and the third member 50, that is, along sides or edges of the second member 48 and the third member 50, are aligned or flush. In the example of FIGS. 2-4 wherein the first adjacent surfaces, the second adjacent surfaces, and the third adjacent surfaces are each aligned or flush, the exterior of the first portion 42 and the second portion 44 are contoured in a manner to provide an appearance and/or functionality similar to an armrest formed of a single integral body. In some examples, the exposed surfaces of the first pivoting joints 52 and the second pivoting joints 54 are configured to be flush with adjacent exterior surfaces of the second portion 44 while the second portion 44 is in the folded configuration.

Figure 3:
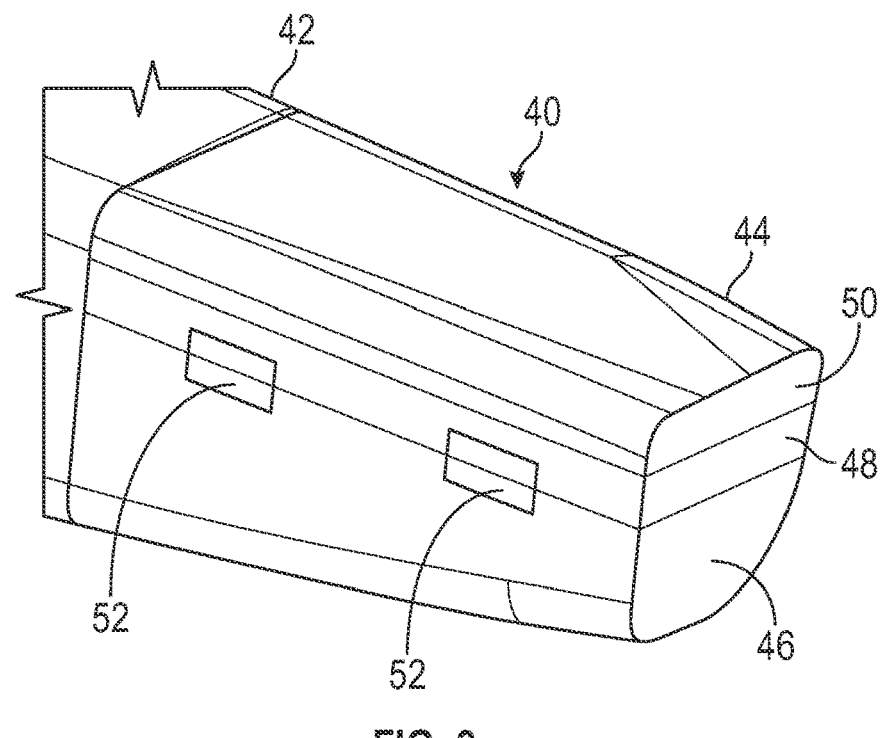
FIG. 3 is a first perspective view of the armrest of FIGS. 1 and 2 in a folded configuration in accordance with an example.
Figure 4:
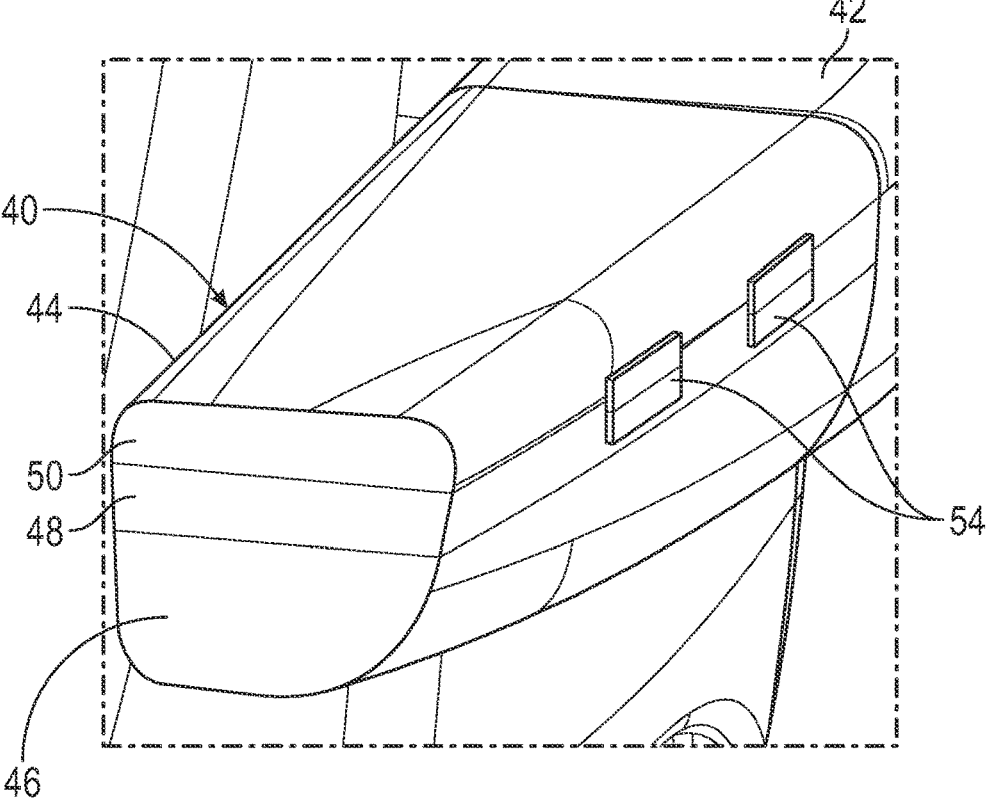
FIG. 4 is a second perspective view of the armrest of FIGS. 1-3 in the folded configuration in accordance with an example.
Figure 5:
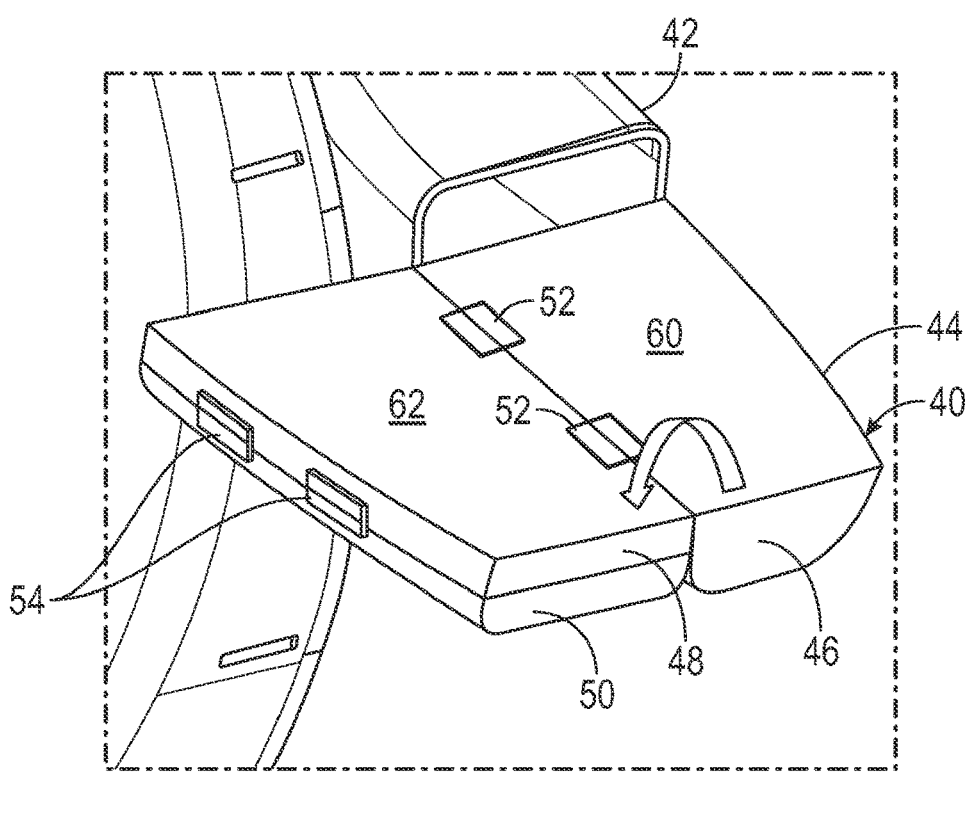
FIG. 5 is a perspective view of the armrest of FIGS. 1-4 in an intermediate configuration in accordance with an example.
Figure 6:
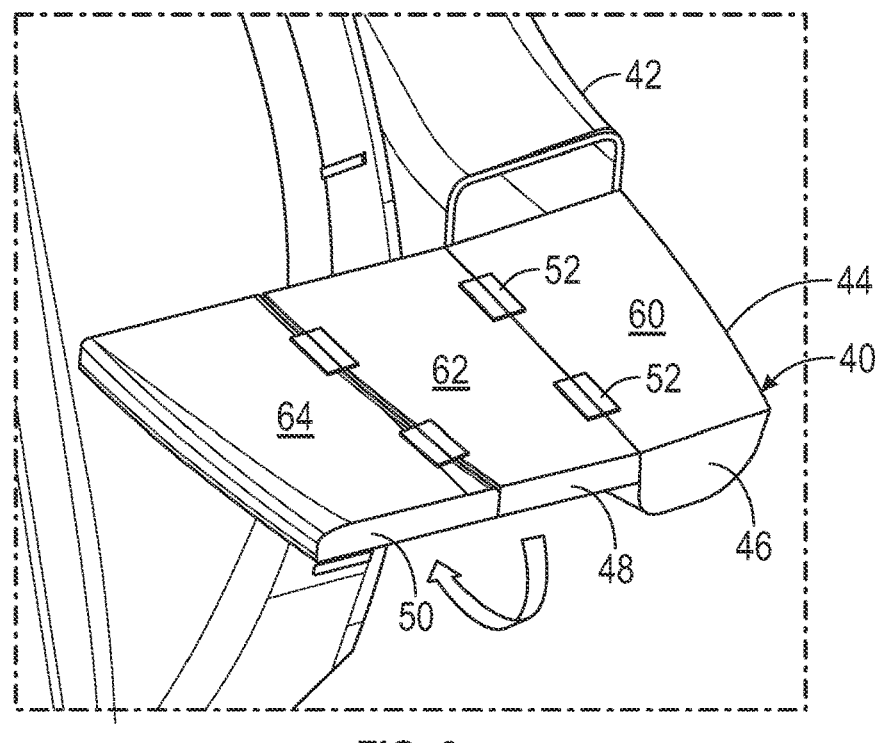
FIG. 6 is a perspective view of the armrest of FIGS. 1-5 in an unfolded configuration in accordance with an example.

FIG. 5 presents the second portion 44 in an intermediate configuration between the folded configuration of FIGS. 2-4 and the unfolded configuration of FIG. 6. The second portion 44 may be transitioned from the folded configuration to the intermediate configuration by pivoting the second member 48 (with the third member 50 stacked thereon) relative to the first member 46 until edges thereof coupled by the first pivoting joints 52 contact or are otherwise disposed adjacent to each other. Since the first pivoting joints 52 are located on the seat side of the armrest 40 in the folded configuration, pivoting of the second member 48 disposes the second member 48 over the seat 30 with the third member 50 disposed below the second member 48.

The second portion 44 may be transitioned from the intermediate configuration to the unfolded configuration by pivoting the third member 50 relative to the second member 48 until edges thereof coupled by the second pivoting joints 54 contact or are otherwise disposed adjacent to each other. Since the second pivoting joints 54 are located on the seat side of the armrest 40 in the intermediate configuration, pivoting of the third member 50 disposes the third member 50 further over the seat 30.

In the example of FIGS. 2-6, the first member 46 includes a first face 60, the second member 48 includes a second face 62 and a third face (not shown) opposite to the second face 62, and the third member 50 includes a fourth face 64 and a fifth face (not shown) opposite the fourth face 64. In the folded configuration, the first face 60 and the second face 62 are in contact or otherwise adjacent and directed toward each other, and the third face and the fifth face are in contact or otherwise adjacent and directed toward each other. In the intermediate configuration, the first face 60 and the second face 62 are aligned in a geometric plane, and the third member 50 is not disposed in the geometric plane. In the unfolded configuration, the first face 60, the second face 62, and the fourth face 64 are aligned in the geometric plane.

In both the intermediate configuration and the unfolded configuration, the second member 48 and the third member 50 are cantilevered from the first member 46, extend across at least a portion of the seat 30, and are configurated to support a load thereon. That is, the first face 60 and the second face 62 define a first support area in the intermediate configuration and the first face 60, second face 62, and the fourth face 64 defined a second support area in the unfolded configuration. Therefore, the occupant may use transition the second portion 44 into either the intermediate configuration or the unfolded configuration, depending on a desired size of support area, and rest a portion of the occupant's body and/or other objects thereon, such as electronic device (e.g., laptop, tablet, smart phone, etc.).

In some examples, one or both of the first pivoting joints 52 and the second pivoting joints 54 may be lockable or otherwise configured to maintain the second member 48 and the third member 50 in fixed positions while a load is applied on one or both of the second face 62 and the fourth face 64. In some examples, the first pivoting joints 52 and the second pivoting joints 54 are dual axis torque hinges.

Figure 7:
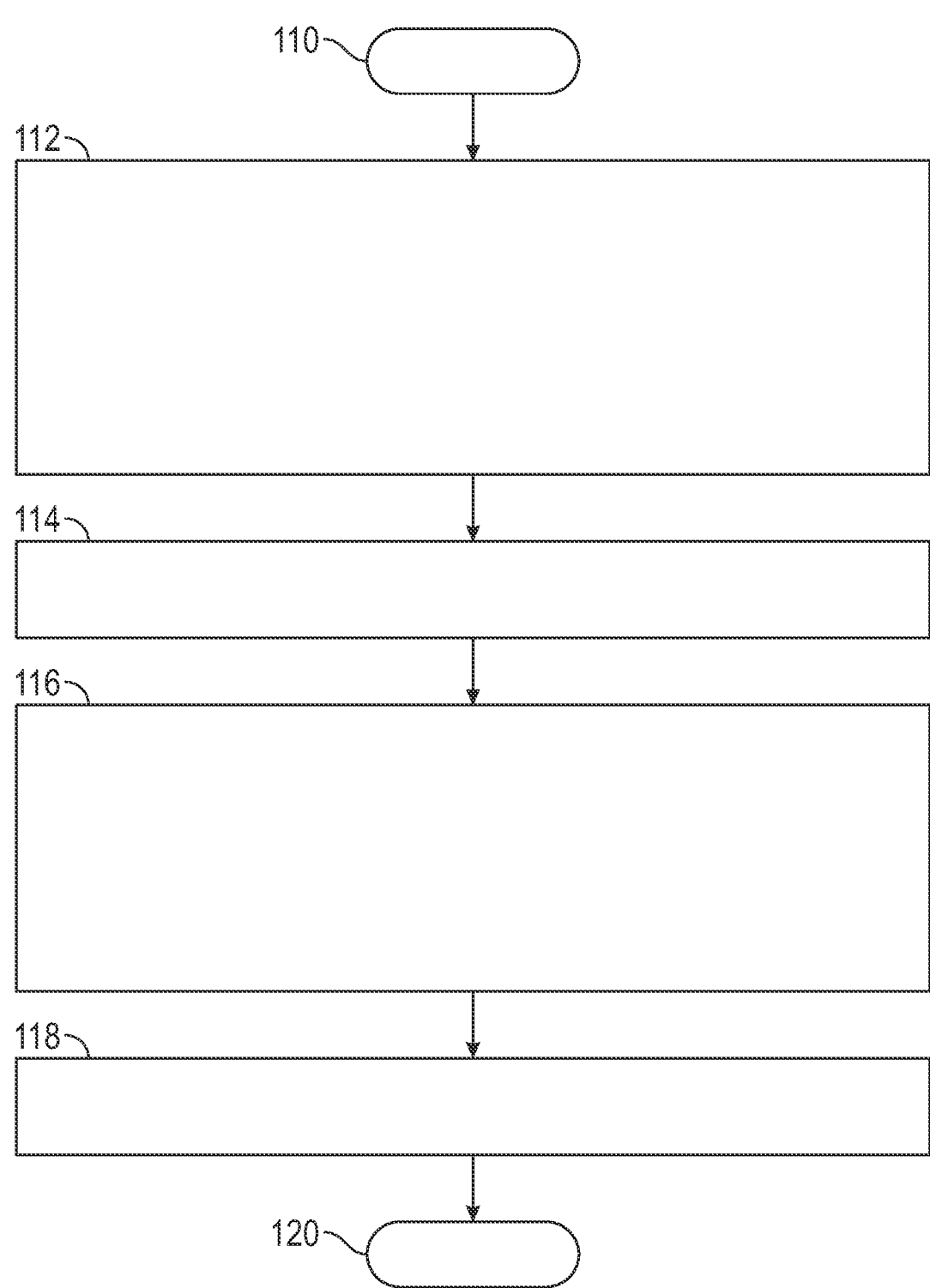
FIG. 7 is a flowchart illustrating a method of using the armrest of FIGS. 1-6 in accordance with an example.

With reference now to FIG. 7 and with continued reference to FIGS. 1-6, a flowchart provides a method 100 for operating the armrest 40, in accordance with various examples. As can be appreciated in light of the disclosure, the order of operation within the method 100 is not limited to the sequential execution as illustrated in FIG. 7, but may be performed in one or more varying orders as applicable and in accordance with the present disclosure.

In one example, the method 100 may start at 110. At 112, the method 100 may include transitioning the armrest 40 from the folded configuration to the unfolded configuration. During the transition, the first member 46 is secured in a fixed position by the first portion 42. Transitioning the armrest 40 from the folded configuration to the unfolded configuration includes pivoting the second member 48 relative to the first member 46 to define the intermediate configuration wherein the second member 48 and the third member 50 are cantilevered from the first member 46 and extend across a first portion of the seat 30, and pivoting the third member 50 relative to the second member 48 to define the unfolded configuration wherein the third member 50 is cantilevered from the second member 48 and extends across a second portion of the seat 30. At 114, the method 100 includes applying a load onto the second member 48 and/or the third member 50. For example, an occupant of the seat 30 may rest a portion of their body (e.g., head, arms, hands, etc.) and/or another object (e.g., book, laptop, smart phone, etc.) on the second member 48 and/or the third member 50.

At 116, the method 100 may include transitioning the armrest 40 from the unfolded configuration to the folded configuration by pivoting the third member 50 relative to the second member 48 such that the third member 50 is stacked with the second member 48 and extends across the first portion of the seat 30, and pivoting the second member 48 relative to the first member 46 such that the second member 48 and the third member 50 are stacked with the first member 46. At 118, the method 100 may include supporting the occupant's arm on the armrest 40. The method 100 may end at 120.

The systems and methods disclosed herein provide various benefits over certain existing systems and methods. For example, an occupant of the seat 30 may unfold the armrest 40 into the unfolded configuration to provide support of a portion of their body and/or another object. This may promote comfort of the occupant and/or ease of various activities such as reading books, using smart phones, tablets, or laptop computers, sleeping, eating, etc. Further, an occupant may fold the armrest into the folded configuration for use in a manner similar to a conventional armrest.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
    transitioning an armrest coupled to a vehicle seat from a folded configuration to an unfolded configuration, the armrest including a first member secured in a fixed position, a second member pivotally coupled to the first member, and a third member pivotally coupled to the second member, wherein the first member, the second member, and the third member are stacked while the armrest is in the folded configuration, and wherein transitioning the armrest from the folded configuration to the unfolded configuration includes:
        pivoting the second member relative to the first member to dispose the armrest in an intermediate configuration, wherein the second member and the third member are cantilevered from the first member and extend across a first portion of the vehicle seat while the armrest is in the intermediate configuration; and
        pivoting the third member relative to the second member to dispose the armrest in the unfolded configuration, wherein the third member is cantilevered from the second member and extends across a second portion of the vehicle seat while the armrest is in the unfolded configuration;
    locking the armrest in the unfolded configuration; and
    applying a load onto at least the third member by resting an object thereon.

2. The method of claim 1, further comprising:
    transitioning the armrest from the unfolded configuration to the folded configuration by:
        pivoting the third member relative to the second member such that the third member is stacked with the second member and extends across the first portion of the vehicle seat; and
        pivoting the second member relative to the first member such that the second member and the third member are stacked with the first member; and
        supporting an arm of an occupant of the vehicle seat on the armrest.

3. The method of claim 2, wherein a first portion of the armrest is coupled to the vehicle seat, a second portion of the armrest includes the first member, the second member, and the third member, and the first member is secured to the first portion and fixed in position relative to the first portion, wherein pivoting the second member relative to the first member such that the second member and the third member are stacked with the first member disposes adjacent exterior surfaces of the first portion and the second portion in aligned positions such that the adjacent exterior surfaces are flush and contoured to appear as an integral body.

4. The method of claim 2, wherein pivoting the second member relative to the first member such that the second member and the third member are stacked with the first member disposes first adjacent exterior surfaces of the first member and the second member in first aligned positions, and second adjacent exterior surfaces of the second member and the third member in second aligned positions.

5. The method of claim 1, wherein pivoting the second member relative to the first member includes pivoting the second member by 180 degrees, wherein pivoting the third member relative to the second member includes pivoting the third member by 180 degrees.

6. The method of claim 1, wherein the second member is disposed between the first member and the third member in the folded configuration such that a first face of the first member is directed toward a second face of the second member, and a third face of the second member oppositely disposed the second face of the second member is directed toward a fourth face of the third member, wherein transitioning the armrest from the folded configuration to the unfolded configuration includes disposing the first face of the first member, the second face of the second member, and a fifth face of the third member oppositely disposed the fourth face of the third member are aligned in a geometric plane.

7. The method of claim 6, wherein the first face of the first member and the second face of the second member are aligned in the geometric plane and the third member is not disposed in the geometric plane while the armrest is in the intermediate configuration.

8. The method of claim 1, wherein the first portion is rotatably coupled to a seatback of the vehicle seat, wherein the second member is coupled to the first member with one or more first joints on a first edge of the second member, the second member is coupled to the third member with one or more second joints on a second edge of the second member oppositely disposed from the first edge.

9. An armrest for a vehicle seat, comprising:

a first portion configured to be coupled to the vehicle seat; and a second portion having a first member secured to the first portion and in a fixed position relative to the first portion, a second member pivotally coupled to the first member, and a third member pivotally coupled to the second member, wherein the second portion is configured to selectively transition between a folded configuration and an unfolded configuration, wherein the first member, the second member, and the third member are stacked and in combination configured to support an arm of an occupant of the vehicle seat while the armrest is in the folded configuration, wherein the second member and the third member are cantilevered from the first member, extend across at least a portion of the vehicle seat, and configurated to support a load from an object resting thereon while the armrest is in the unfolded configuration, wherein, while the armrest is in the folded configuration, the second member is disposed between the first member and the third member such that a first face of the first member is directed toward a second face of the second member and a third face of the second member oppositely disposed the second face of the second member is directed toward a fourth face of the third member.

10. The armrest of claim 9, wherein the first face of the first member, the second face of the second member, and a fifth face of the third member oppositely disposed the fourth face of the third member are aligned in a geometric plane while the armrest is in the unfolded configuration.

11. The armrest of claim 9, wherein the second portion is configured to transition from the folded configuration to the unfolded configuration by pivoting the second member relative to the first member over the vehicle seat to dispose the armrest in an intermediate configuration, and then pivoting the third member relative to the second member over the vehicle seat, wherein the first face of the first member and the second face of the second member are aligned in a geometric plane and the third member is not disposed in the geometric plane while the armrest is in the intermediate configuration.

12. The armrest of claim 9, wherein adjacent exterior surfaces of the first portion and the second portion are aligned such that the adjacent exterior surfaces are flush and contoured to appear as an integral body while the armrest is in the folded configuration.

13. The armrest of claim 9, wherein first adjacent exterior surfaces of the first member and the second member are aligned and second adjacent exterior surfaces of the second member and the third member are aligned while the armrest is in the folded configuration.

14. The armrest of claim 9, wherein the second portion is configured to transition from the folded configuration to the unfolded configuration by pivoting the second member relative to the first member over the vehicle seat to dispose the armrest in an intermediate configuration, and then pivoting the third member relative to the second member over the vehicle seat.

15. The armrest of claim 9, wherein the second member is configured to pivot relative to the first member by 180 degrees, wherein the third member is configured to pivot relative to the second member by 180 degrees.

16. The armrest of claim 9, wherein the first portion is rotatably coupled to a seatback of the vehicle seat, wherein the second member is coupled to the first member with one or more first joints on a first edge of the second member, the second member is coupled to the third member with one or more second joints on a second edge of the second member oppositely disposed from the first edge, and the second member and the third member are configured to be lockable while in the unfolded configuration.

17. A vehicle, comprising:

a vehicle seat;

an armrest including:

a first portion coupled to the vehicle seat; and a second portion having a first member secured to the first portion and fixed in position relative to the first portion, a second member pivotally coupled to the first member, and a third member pivotally coupled to the second member, wherein the second portion is configured to selectively transition between a folded configuration and an unfolded configuration, wherein the first member, the second member, and the third member are stacked and in combination configured to support an arm of an occupant of the vehicle seat while the armrest is in the folded configuration, wherein the second member and the third member are cantilevered from the first member, extend across at least a portion of the vehicle seat, and configurated to support a load from an object resting thereon while the armrest is in the unfolded configuration, wherein, while the second portion is in the folded configuration, the second member is disposed between the first member and the third member such that a first face of the first member is directed toward a second face of the second member and a third face of the second member oppositely disposed the second face of the second member is directed toward a fourth face of the third member, wherein adjacent exterior surfaces of the first portion and the second portion are aligned such that the adjacent exterior surfaces are flush and contoured to appear as an integral body while the second portion is in the folded configuration.

18. The vehicle of claim 17, wherein the second face of the second member, and a fifth face of the third member oppositely disposed the fourth face of the third member are aligned in a geometric plane while the armrest is in the unfolded configuration.

19. The vehicle of claim 18, wherein the second portion is configured to transition from the folded configuration to the unfolded configuration by pivoting the second member relative to the first member over the vehicle seat to dispose the armrest in an intermediate configuration, and then pivoting the third member relative to the second member over the vehicle seat, wherein the first face of the first member and the second face of the second member are aligned in the geometric plane and the third member is not disposed in the geometric plane while the armrest is in the intermediate configuration.

20. The vehicle of claim 17, wherein the first portion is rotatably coupled to a seatback of the vehicle seat, wherein the second member is coupled to the first member with one or more first joints on a first edge of the second member, the second member is coupled to the third member with one or more second joints on a second edge of the second member oppositely disposed from the first edge, and the second member and the third member are configured to be lockable while in the unfolded configuration.

* * * * *